United States Patent
Deboy (10) Patent No.: US 9,488,995 B2
(45) Date of Patent: Nov. 8, 2016

(54) VOLTAGE CONVERTER AND VOLTAGE CONVERSION METHOD HAVING MULTIPLE CONVERTER STAGES

(71) Applicant: Infineon Technologies Austria AG, Villach (AT)

(72) Inventor: Gerald Deboy, Klagenfurt (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 280 days.

(21) Appl. No.: 13/846,194

(22) Filed: Mar. 18, 2013

(65) Prior Publication Data

US 2013/0214750 A1    Aug. 22, 2013

Related U.S. Application Data

(63) Continuation of application No. 12/824,693, filed on Jun. 28, 2010, now Pat. No. 8,400,123.

(51) Int. Cl.
| | |
|---|---|
| *G05F 1/00* | (2006.01) |
| *G05F 1/573* | (2006.01) |
| *G05F 1/46* | (2006.01) |
| *H02M 3/158* | (2006.01) |
| *H02M 3/28* | (2006.01) |
| *H02M 1/00* | (2006.01) |

(52) U.S. Cl.
CPC ............. *G05F 1/46* (2013.01); *H02M 3/1584* (2013.01); *H02M 3/285* (2013.01); *H02M 2001/0019* (2013.01)

(58) Field of Classification Search
CPC ......... G05F 1/613; G05F 1/614; G05F 1/618
USPC ....... 323/268, 269, 271, 272, 274, 277, 283, 323/284
See application file for complete search history.

(56) References Cited

U.S. PATENT DOCUMENTS

| | | | |
|---|---|---|---|
| 4,257,090 A | 3/1981 | Kroeger et al. | |
| 4,366,522 A | 12/1982 | Baker | |
| 5,610,507 A | 3/1997 | Brittan | |
| 5,659,241 A | 8/1997 | Horiuchi et al. | |

(Continued)

FOREIGN PATENT DOCUMENTS

| | | |
|---|---|---|
| DE | 10216252 | 11/2003 |
| DE | 10223771 | 12/2003 |

(Continued)

*Primary Examiner* — Adolf Berhane
*Assistant Examiner* — Gary Nash
(74) *Attorney, Agent, or Firm* — Slater Matsil, LLP (57) ABSTRACT

A voltage converter includes a first converter stage including a unipolar transistor coupled to a first inductive storage element, where the first converter stage is configured to provide a first output power signal including a first output current. Also, the voltage converter includes a second converter stage including a bipolar transistor coupled to a second inductive storage element, where the second converter stage is configured to provide a second output power including a second output current, and where a third output current is a sum of the first output current and the second output current. Additionally, the voltage converter includes a control circuit configured to control a power converter including the first output current and the second output current, where the first output current is higher than the second output current when the third output current has a first range of output current.

27 Claims, 7 Drawing Sheets

(56) References Cited

U.S. PATENT DOCUMENTS

| | | | |
|---|---|---|---|
| 6,084,790 A * | 7/2000 | Wong | 363/71 |
| 7,116,087 B2 * | 10/2006 | Zhang et al. | 323/272 |
| 2008/0303495 A1 * | 12/2008 | Wei et al. | 323/272 |
| 2008/0307242 A1 | 12/2008 | Qu | |
| 2008/0315982 A1 * | 12/2008 | Wei et al. | 336/155 |

FOREIGN PATENT DOCUMENTS

| | | |
|---|---|---|
| DE | 10250155 | 5/2004 |
| DE | 60112789 | 3/2006 |
| DE | 102005045889 | 4/2007 |

* cited by examiner

VOLTAGE CONVERTER AND VOLTAGE CONVERSION METHOD HAVING MULTIPLE CONVERTER STAGES

This application is a continuation of U.S. patent application Ser. No. 12/824,693, entitled "Voltage Converter and Voltage Conversion Method," filed on Jun. 28, 2010, which application is incorporated herein by reference.

TECHNICAL FIELD

The present invention relates to a voltage converter, in particular a switched-mode converter, and to a voltage conversion method.

BACKGROUND

Switched-mode voltage converters or power converters are widely used in the field of electric power supplies. Voltage converters can be implemented as controlled voltage sources that provide a controlled output voltage from an input voltage, or can be implemented as controlled current sources that provide a controlled (mean) output current. The input voltage can be a DC voltage or an AC voltage. Voltage converters which receive an AC voltage are, for example, Power Factor Controllers (PFCs). A PFC is, for example, used for providing a DC link voltage from an AC main voltage.

To supply high output currents, a voltage converter can be implemented to include two or more converter stages connected in parallel. Each converter stage includes at least one inductive storage element and a switch which controls a current flow through the inductive storage element. The switch is driven by a pulse-width modulated (PWM) drive signal, wherein the output current of each converter stage is controlled by the duty-cycle of the PWM drive signal.

The switches in the converter stages are usually implemented as transistors, such as, for example, MOSFETs or IGBTs. MOSFETs are unipolar transistors that are available with a low on-resistance. However MOSFETs with a low on-resistance usually have a high output capacitance. Each time the MOSFET is switched off, electric charge is stored in the output capacitance.

Voltage converters can be operated in different operation modes. One possible operation mode is a continuous conduction mode (CCM), which is, for example, used for supplying high output currents. When a voltage converter or a converter stage is operated in the CCM, a current through the inductive storage element does not decrease to zero. The output capacitance of a MOSFET implemented in a converter that is operated in CCM causes high switching losses during turn on due to the energy stored in the output capacitance.

IGBTs are bipolar transistors that at low currents have higher losses than MOSFETs.

There is, therefore, a need to provide a voltage converter that has low losses for low output currents or low output powers as well as for high output currents or high output powers.

SUMMARY OF THE INVENTION

In accordance with an embodiment, a voltage converter includes a first converter stage including a unipolar transistor coupled to a first inductive storage element, where the first converter stage is configured to provide a first output power signal including a first output voltage and a first output current. Also, the voltage converter includes a second converter stage including a bipolar transistor coupled to a second inductive storage element, where the second converter stage is configured to provide a second output power including a second output current and a second output voltage, where a third output power includes a third output current and a third output voltage, and where the third output current is a sum of the first output current and the second output current. Additionally, the voltage converter includes a control circuit configured to control a power converter including the first output current and the second output current, where the first output current is higher than the second output current when the third output current has a first range of output current.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

FIG. 2 which includes

DETAILED DESCRIPTION OF ILLUSTRATIVE EMBODIMENTS

Figure 1:
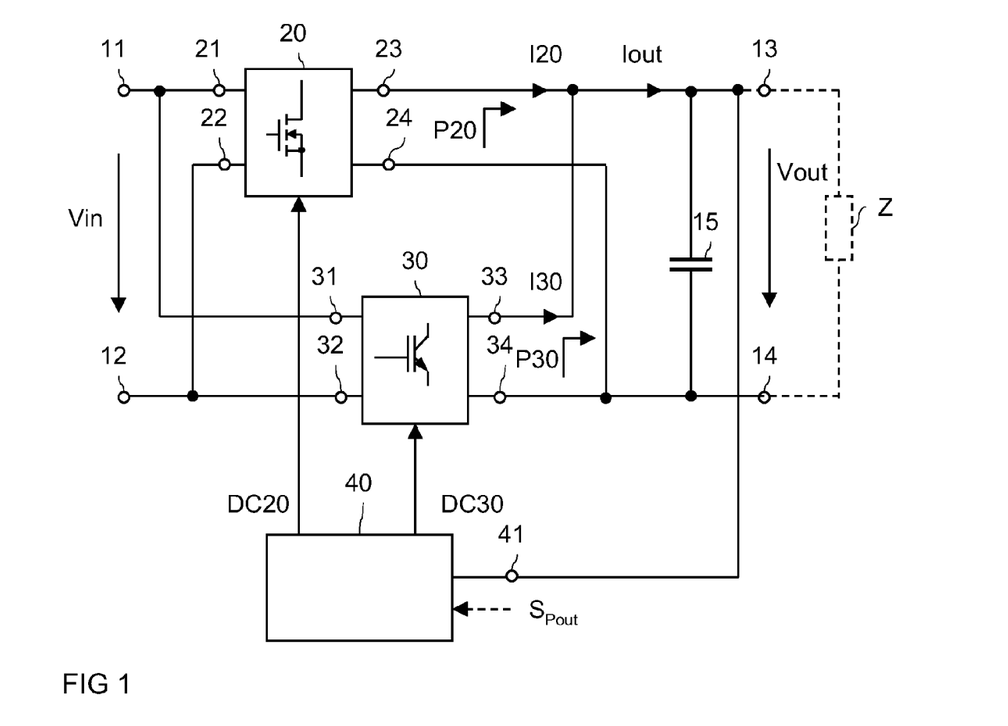
FIG. 1 schematically illustrates a first embodiment of a voltage converter which includes a first converter stage with an unipolar transistor, a second converter stage with a bipolar transistor, and a control circuit.

FIG. 1 illustrates a first embodiment of a voltage converter. The voltage converter includes input terminals 11, 12 for receiving an input voltage Vin and output terminals 13, 14 for providing an output voltage Vout and an output current Iout. A first converter stage 20 is connected between the input terminals 11, 12 and the output terminals 13, 14.

For this, input terminals 21, 22 of the first converter stage 20 are each connected with one of the input terminals 11, 12 of the voltage converter, and output terminals 23, 24 of the first converter stage 20 are each connected with one of the output terminals 13, 14 of the voltage converter. The output voltage Vout is available across an output capacitor 15 connected between the output terminals 13, 14. The first converter stage 20 is implemented as a switched-mode voltage converter or power converter which includes at least one unipolar transistor acting as a switch and at least one inductive storage element. In connection with the discussion hereinbelow it is assumed that the unipolar transistor is implemented as a MOSFET. However, other kinds of unipolar transistors, such as JFETs, may be used as well.

The voltage converter further includes at least one second converter stage 30 connected in parallel with the at least one first converter stage 20 and connected between the input terminals 11, 12 and the output terminals 13, 14 of the voltage converter. For this, input terminals 31, 32 of the second converter stage 30 are each connected with one of the input terminals 11, 12 of the voltage converter and output terminals 33, 34 of the second converter stage 30 are each connected with one of the output terminals 13, 14 of the voltage converter. The at least one second converter stage 30 is implemented as a switched-mode voltage converter or power converter with at least one bipolar transistor acting as a switch and at least one inductive storage element. In connection with the discussion hereinbelow it is assumed that the bipolar transistor is implemented as an IGBT. However, other kinds of bipolar transistors, such as bipolar junction transistors (BJTs), may be used as well.

When the voltage converter is in operation, the first converter stage 20 provides a first output current I20, and the second converter stage 30 provides a second output current I30. The overall output current Iout of the voltage converter is the sum of the first and second output currents I20, I30. An output power P20 of the first converter stage 20 is given by the product of the first output current I20 and the output voltage Vout, and a second output power P30 of the second converter stage 30 is given by the product of the second output current I30 and the output voltage Vout. An overall output power Pout of the voltage converter is given by the sum of the first and second output powers P20, P30, i.e.:

$$Pout = Vout \cdot Iout = P20 + P30 = (I20 + I30) \cdot Vout \quad (1)$$

The voltage converter is capable of adapting the output power Pout to the power consumption of a load Z (shown in dashed lines) that can be connected to the output terminals 13, 14. The voltage converter is, in particular, capable of adjusting its output power to any specific power value within a specified power range that ranges from about 0 to a maximum output power $Pout_{max}$, with $Pout_{max} = Vout \cdot Iout_{max}$, wherein $Iout_{max}$ is the maximum output current of the converter stage.

Each of the at least one first converter stage 20 and at least one second converter stage 30 contributes a share of the output power Pout consumed by the load Z. The voltage converter further includes a control circuit 40 that defines which share of the output power Pout is delivered by the at least one converter stage 20 and which share is delivered by the at least one second converter stage 30. The control circuit 40 provides a first control signal DC20 received at a control input of the first converter stage 20, and provides a second control signal DC30 received at a control input of the second converter stage 30.

As it is commonly known, switches in a switch-mode voltage converter, such as the first and the second converter stages 20, 30, are switched on and off using a pulse-width modulated (PWM) drive signal that has a duty cycle (DC). The first and second control signals DC20, DC30 provided by the control circuit 40 which set the output powers P20, P30 of the first and second converter stages 20, 30 are, for example, configured to adjust the duty cycles of these drive signals in the first and second converter stages 20, 30 in order to adjust or set the output powers P20, P30 of these converter stages.

In order to adapt the output power Pout of the voltage converter to the power consumption Z of the load the control circuit 40 monitors the output voltage Vout. This is schematically illustrated in FIG. 1 by the control circuit 40 having a control input 41 connected to one 13 of the output terminals 13, 14. In this connection it should be mentioned that it is not necessary to connect the control circuit 40 directly with one of the output terminals 13, 14; the control circuit 40 can receive any signal that is representative of the output voltage Vout in order to control the overall output power Pout. When the output voltage Vout increases because of a decrease in the power consumption of the load Z, then the control circuit 40 reduces the output power of the first converter stage 20 and/or the second converter stage 30 through the first and second control signals DC20, DC30. When the output voltage Vout decreases because of an increase in the power consumption of the load Z, then the control circuit 40 counteracts a further decrease of the output voltage Vout by increasing the output power P20, P30 of the first converter stage 20 and/or the second converter stage 30.

The control circuit 40 is configured to individually adjust the output powers P20, P30 of the first and second converter stages 20, 30 dependent on the overall output power Pout. The control circuit 40 is, in particular, configured to control the first and second converter stages 20, 30 such that the output current Iout is not equally shared by the first and second converter stages 20, 30 over the complete output current range, but that there is at least one output current range in which one of the converter stages 20, 30 provides the majority of the output current Iout. In particular, there is a first output current range in which the first output current I20 provided by the first converter stage 20 with the at least one MOSFET is higher than the second output current I30 provided by the second converter stage 30 with the at least one IGBT.

Figure 2A:
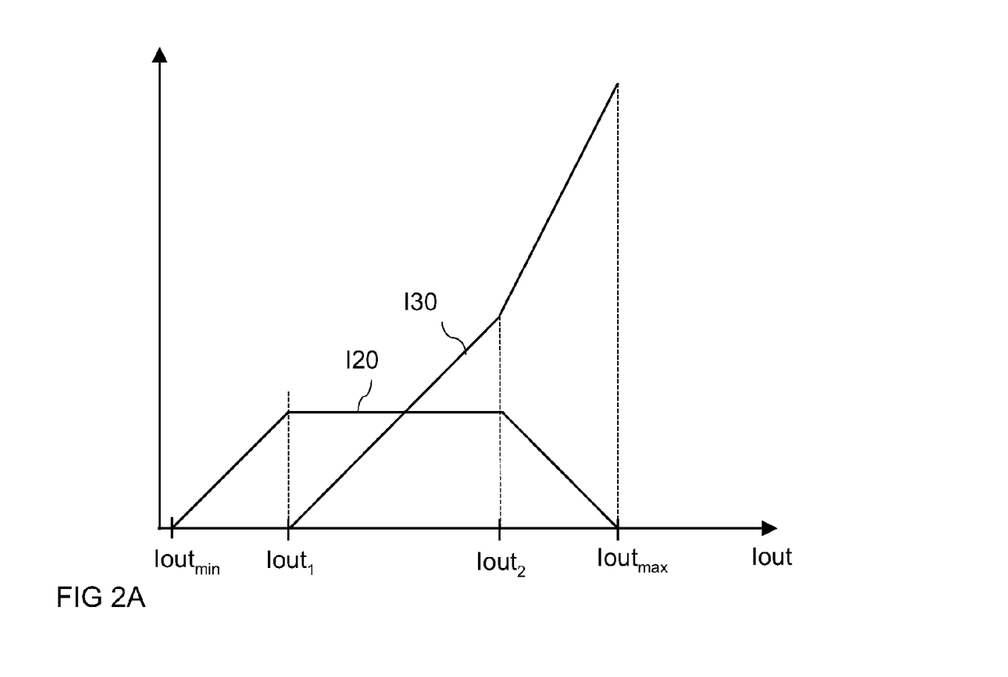
FIGS. 2A and 2B illustrates the operating principle of two different embodiments of the voltage converter by showing the relationship between the output current of the first converter stage and the output current of the second converter stage dependent on the overall output current.
Figure 2B:
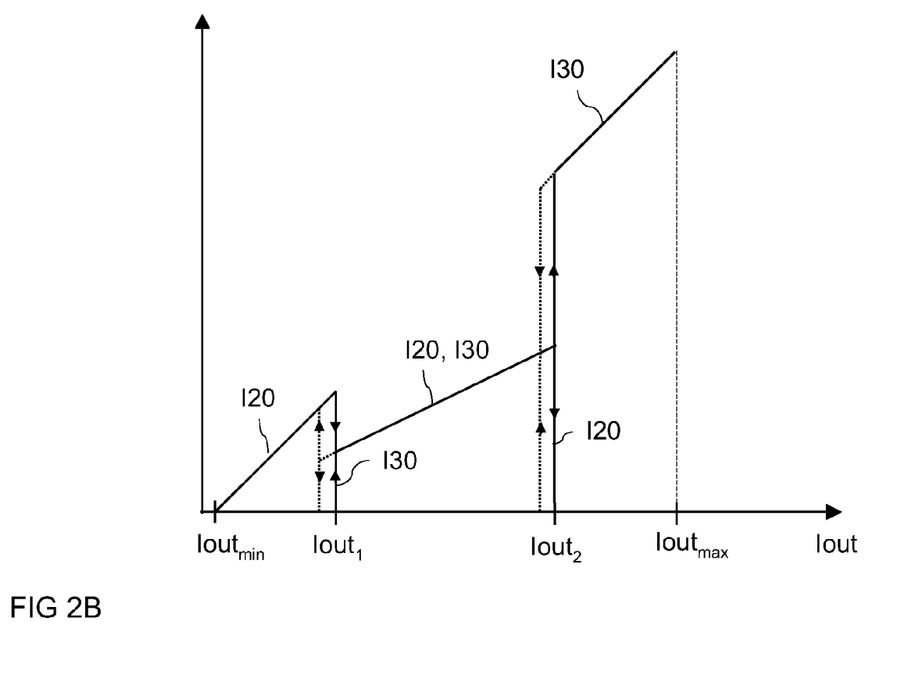

For sharing the output current between the at least two converter stages 20, 30 different current sharing schemes can be applied. For explanation purposes, FIGS. 2A and 2B show two embodiments of such current sharing schemes. These Figures illustrate the first and second output currents I20, I30 dependent on the overall output current Iout.

In the embodiment illustrated in FIG. 2A there is a first output current range which ranges from a minimum output current $Iout_{min}$ to a first current threshold $Iout_1$ for which the second output current I30 is zero and for which only the first output current I20 increases with increasing overall output current Iout. The first threshold value $Iout_1$ is, for example, between 10% and 50% of the maximum current output $Iout_{max}$. The minimum output current $Iout_{min}$ is the minimum current the voltage converter can provide. This minimum current $Iout_{min}$ can be zero. The maximum output current $Iout_{max}$ is dependent on the specific type of converter stages and the number of converter stages that are connected in parallel. This maximum output current $Iout_{max}$ can be up to 100 A and more.

Having a second output current I20 of zero for an overall output current Iout which is within the first output current range [$Iout_{min}$, $Iout_1$] is equivalent to the second converter stage 30 being switched off. Operating only the first converter stage with the MOSFET for small output currents Iout, such as output currents that are within the first output current range, is favorable in terms of inevitable switching losses or power losses that occur in the operation of switched-mode voltage converters, such as the voltage converters implemented in the first and second converter stages 20, 30. Switched-mode voltage converters implemented with MOSFETs have lower power losses at low output currents than switched-mode power converters implemented with IGBTs.

Switched-mode power converters implemented with IGBTs are, however, superior in terms of switching losses at higher output currents. According to one embodiment there is, therefore, a second output current range [Iout$_2$, Iout$_{max}$] in which the second output current I30 provided by the second converter stage 30 is higher than the first output current I20 provided by the first converter stage 20. The second output current range ranges from a second threshold Iout$_2$ to the maximum output current Iout$_{max}$. The second threshold Iout$_2$ is, for example, in the range of between 50% to 80% of the maximum output current Iout$_{max}$. In the second output current range [Iout$_2$, Iout$_{max}$] the first output current I20 is, for example, zero, has a constant value higher than zero, or decreases, with the latter being illustrated in FIG. 2.

According to one embodiment, the first threshold Iout$_1$ equals the second threshold Iout$_2$, which is, for example, 50% of the maximum output current Iout$_{max}$.

According to the embodiment illustrated in FIG. 2, there is a third output current range between the first threshold Iout$_1$ and the second threshold Iout$_2$. Within this third output current range [Iout$_1$, Iout$_2$] the second output current I30 increases with increasing overall output current Iout, while the first output current I20 is constant (as illustrated), or even decreases (not illustrated).

In the embodiment illustrated in FIG. 2B, the second output current I30 is zero in the first output current range [Iout$_{min}$, Iout$_2$], and the first output current I20 is zero in the second output current range [Iout$_2$, Iout$_{max}$]. Thus, the output current Iout corresponds to the first output current I20 in the first range and corresponds to the second current I30 in the second range. In the third output current range [Iout$_1$, Iout$_2$], which is between the first and second output current ranges, the output current Iout is equally provided by the first and second output currents, i.e., the first output current I20 equals the second output current I30, i.e. I20=I30.

In the current curves of FIG. 2B there are abrupt changes in the first and second currents I20, I30 at the first and second thresholds, respectively. When the rising output current Iout reaches the first threshold Iout$_1$, the first current I20 drops to half of its value, and the second current I30 jumps to the value of the second current, and when the rising output current Iout reaches the second threshold Iout$_2$, the first current I20 drops to zero, and the second current I30 doubles its value. Equivalently, when the falling output current Iout reaches the second threshold Iout$_2$, the second current I30 drops to half of its value and the first current I20 jumps to the value of the second current I30, and when the falling output current Iout reaches the first threshold Iout$_1$, the second current I30 drops to zero and the first current I20 doubles its value.

In order to prevent instabilities of the voltage converter when the output current is in the region of the first and second threshold values Iout$_1$, Iout$_2$ the current curves optionally have a hysteretic behavior, which is illustrated in dotted lines in FIG. 2B. By virtue of the hysteretic behavior the threshold values that cause the first and second output currents I20, I30 to abruptly change their current values are different for a rising and a falling output current. In the embodiment illustrated in FIG. 2B, with a rising output current abrupt changes of the first and second output currents I20, I30 occur at the first and second threshold values Iout$_1$, Iout$_2$ while with a falling output current Iout the corresponding abrupt changes occur at threshold values which are slightly smaller than the first and second threshold values Iout$_1$, Iout$_2$. According to one embodiment, the threshold values for the falling current Iout are between 0.5% and 2% smaller than the threshold values Iout$_1$, Iout$_2$ for the rising current, or between 0.5% and 2% of the maximum current smaller than the threshold values Iout$_1$, Iout$_2$ for the rising current.

Figure 3:
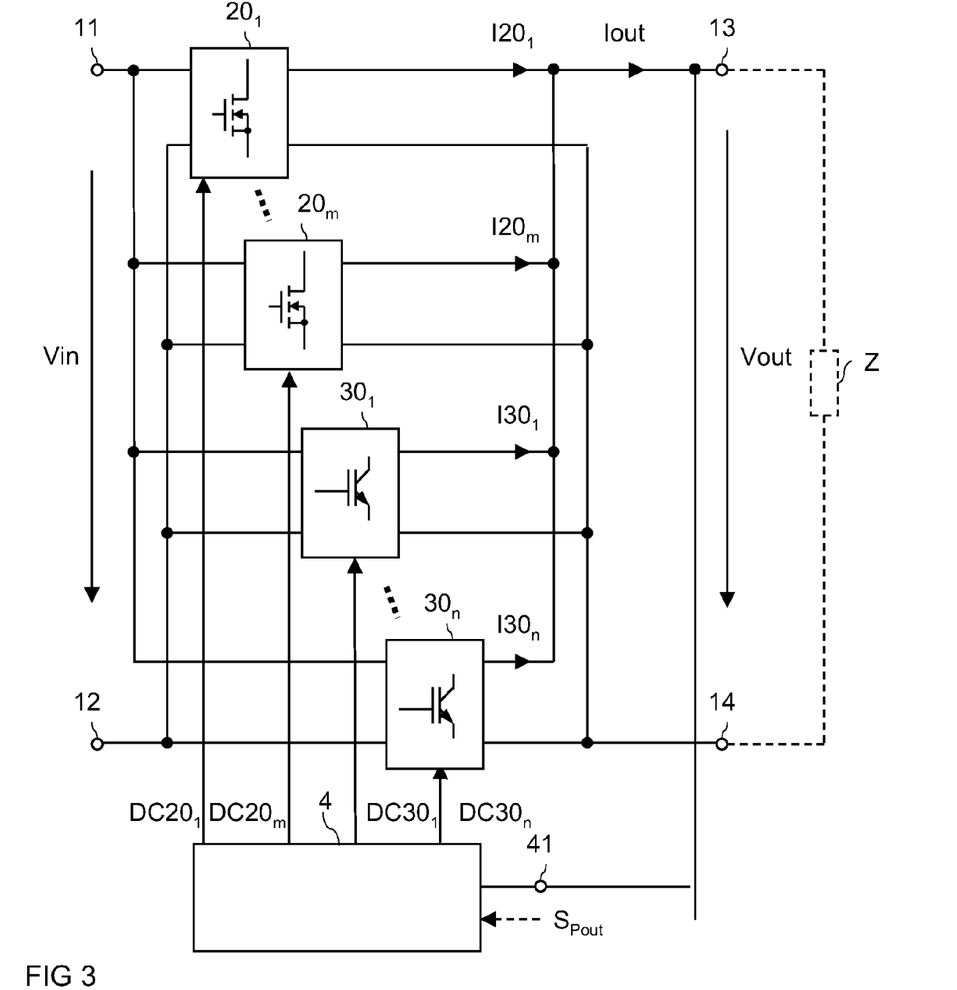
FIG. 3 illustrates a second embodiment of a voltage converter with a plurality of first converter stages, a plurality of second converter stages and a control circuit.

For explanation purposes the explanation provided in connection with FIGS. 2A and 2B was based on the assumption that there are one first converter 20 providing the first output current I20 and one second converter 30 providing the second output current I30. Referring to FIG. 3 it is also possible to provide several first and several second converter stages.

FIG. 3 illustrates a second embodiment of a voltage converter. This voltage converter includes a plurality of m, with m>1, of first converter stages $20_1$, $20_m$, and a plurality of n, with n>1, second converter stages $30_1$, $30_n$. The explanation that has been given hereinabove with regard to the first and second converter stages 20, 30, illustrated in FIG. 1 apply to the first and second converter stages $20_1$, $20_m$, $30_1$, $30_n$ illustrated in FIG. 3 accordingly. In the voltage converter of FIG. 3 the individual converter stages are each connected between the input terminals 11, 12 and the output terminals 13, 14 and are connected in parallel with each other. The number m of first converter stages can be equal to the number n of second converter stages. However, these numbers can also be different from another.

According to one embodiment there are less first converter stages, which mainly provide the output current Iout at a low power consumption of the load Z, than second converter stages, which mainly provide the output current Iout at high power consumptions of the load Z.

Referring to FIG. 3 the control circuit 4 can be configured to provide one control signal $DC20_1$, $DC20_m$, $DC30_1$, $DC30_n$ for each of the individual converter stages $20_1$-$30_n$. According to another embodiment the first converter stages $20_1$, $20_m$ are implemented with identical converter topologies, and the second converter stages $30_1$, $30_n$ are implemented with identical converter topologies. In this case the control circuit 4 can also be implemented to provide one common first control signal to the first converter stages $20_1$, $20_m$, and one common second control signal to the second converter stages $30_1$, $30_n$.

The first converter stages $20_1$, $20_m$ together provide the first output current I20, i.e., $$I20 = \sum_{i=1}^{m} I20_i, \tag{2}$$

and the second converter stages $30_1$, $30_n$ together provide the second output current I30, i.e., $$I30 = \sum_{j=1}^{m} I30_j, \tag{3}$$

The explanation that has been given hereinabove concerning the relationship between the first output current I20 and the second output current I30 dependent on the overall output current Iout applies to the first output current I20 provided by the plurality of first converter stages $20_1$, $20_m$ and to the second output current I30 provided by the plurality of second converter stages $30_1$, $30_n$ accordingly.

According to a first embodiment the control circuit 4 is configured to control the individual first converter stages $20_1$, $20_m$ such that they provide equal shares of the first output current I20, so that:

$$I20_i = \frac{I20}{m}, \quad (4)$$

wherein $I20_i$ represents one of the output currents $I20_1$, $I20_m$ of the first converter stages $20_1$, $20_m$. Accordingly, the control circuit 4 controls the individual second converter stages $30_1$, $30_n$ such that they provide equal shares of the second output current I30, so that:

$$I30_j = \frac{I30}{n}, \quad (5)$$

wherein $I30_j$ represents one of the output currents $I30_1$, $I30_n$ of the second converter.

Further, when a current sharing principle according to FIG. 2B is applied, it is, for example, possible to share the current between the first and second converter stages according to equations (4) and (5) when the output current is in the first and second output current ranges [$Iout_{min}$, $Iout_1$], [$Iout_2$, $Iout_{max}$], and to equally share the current between the first and second converter stages when the output current Iout is in the third output current range [$Iout_1$, $Iout_2$], so that:

$$I20_i = I30_j = \frac{Iout}{m+n}. \quad (6)$$

Figure 4:
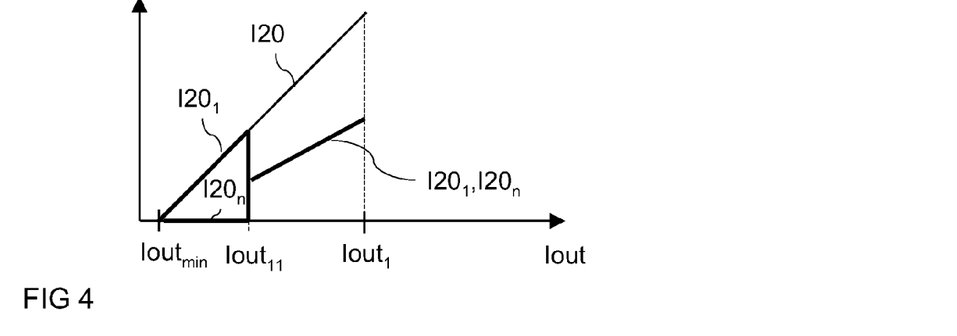
FIG. 4 illustrates one embodiment of an operating principle of a voltage converter with several first converter stages.

FIG. 4 illustrates the operating principle of a voltage converter with several first converter stages in which the first current I20 is not equally shared between the individual converter stages for an output current Iout within the first output current range. FIG. 4 illustrates a current sharing between two first converter stages—with each converter stage providing an output current $I20_1$, $I20_m$—within the first output current range [$Iout_{min}$, $Iout_1$]. In the embodiment according to FIG. 4 the control circuit 4 switches one of the first converter stages, namely the first converter stage providing the output current $I20_m$, off when the overall output current Iout reaches a sub-threshold $Iout_{11}$. At this sub-threshold $Iout_{11}$ the current $I20_m$ decreases to zero, while the current $I20_1$ increases in order to take the overall output current Iout.

For output currents Iout higher than the sub-threshold $Iout_{11}$ the output current is equally shared between the two first converter stages, i.e., the output currents $I20_1$, $I20_m$ are higher than zero. It should be mentioned that the illustration in FIG. 4 is based on the assumption that the second output current I30 is zero within the first output current range. However, this is only an example. The second output current I30 could also have other current values than zero within the first output current range. However, the sharing of the first output current I20 between the individual first converter stages $20_1$, $20_m$ does not generally change.

The basic principle of a current sharing between two first converter stages that is illustrated in FIG. 4 can be applied to voltage converters with more than two first converter stages as well. According to this basic principle for output currents Iout within the first output current range an increasing number of first converter stages is switched off with increasing output current Iout.

A control method that switches on or off converter stages can also be applied to the second converter stages. According to one embodiment, for output currents within the second output current range [$Iout_2$, $Iout_{max}$] the number of second converter stages that are switched on is dependent on the output current Iout such that with increasing output current Iout an increasing number of second converter stages is switched on.

Figure 5:
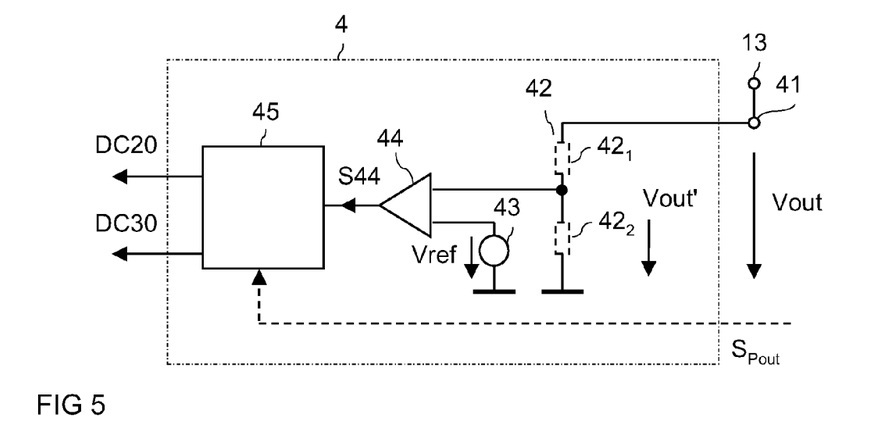
FIG. 5 illustrates an embodiment of the control circuit.

FIG. 5 schematically illustrates an embodiment of the control circuit 4. Control circuit 4 includes a controller 44 that receives a reference voltage Vref and the output voltage Vout or a voltage Vout' that is dependent on the output voltage Vout. This voltage Vout' is, in particular, proportional to the output voltage Vout. The voltage Vout' is, for example, generated by an optional resistive voltage divider 42 with first and second voltage divider resistors $42_1$, $42_2$ from the output voltage Vout. Controller 44 calculates a difference between the output voltage Vout or the voltage Vout' and the reference voltage Vref and generates a control signal S44 which is representative of the (desired) output power Pout of the voltage converter. Controller 44 includes a filter for filtering the difference between the voltages Vout or Vout' and Vref received at its input terminals and for generating the control signal S44 from this difference. The filter implemented in the controller 44 can have a proportional (P) characteristic, an integrating (I) characteristic or a proportional-integrating (PI) characteristic.

A sharing unit 45 receives the output power control signal S44 and generates the individual control signals of the individual converter stages of the voltage converter. In FIG. 5 only two (DC20, DC30) of these control signals are shown. However, the number of converter stage control signals provided by the sharing unit 45 may, of course, vary with the number of converter stages connected in parallel.

The output power control signal S44 is representative of the output power Pout of the voltage converter and is, therefore, representative of the output current Iout. Thus, the current sharing unit 45 can use the output power control signal S44 to generate the converter stage control signals DC20, DC30 such that their output powers (see P20, P30 in FIG. 1) or output currents (see I20, I30 in FIG. 2) meet the relationship that has been explained hereinabove. Optionally, the sharing unit 45 additionally receives a signal $S_{Pout}$ which is indicative of the output power Pout of the converter.

The converter with one first and one second converter stages 20, 30 according to FIG. 1 and the converter with the plurality of first converter stages $20_1$-$20_m$ and the plurality of second converter stages $30_1$-$30_n$ are multiphase converters.

Conventional multiphase converters have a plurality of identical converter stages that equally provide a share of an output current. In particular, when a current sharing scheme according to FIG. 2B is applied, the converters according to FIGS. 1 and 4 can be operated like conventional multiphase converters with the difference that in the converters of FIGS. 1 and 4 the second converter stage 30 or the second converter stages $30_1$-$30_n$ are switched off for an output current below the first threshold $Iout_1$ (or below the first threshold Iout$_1$ minus a hysteresis value), and that the first converter stage 20 or the first converter stages 20$_1$-20$_m$ are switched off for an output current Iout above the second threshold Iout$_2$. In case there are several first and second converter stages, the first converter stages 20$_1$-20$_m$ can equally contribute to the output current Iout when the output current is in the first range [Iout$_{min}$, Iout$_1$], the second converter stages 30$_1$-30$_n$ can equally contribute to the output current Iout when the output current is in the second range [Iout$_2$, Iout$_{max}$], and the first and second converter stages can equally contribute to the output current Iout when the output current is in the third range [Iout$_1$, Iout$_2$]. It is, of course, also possible to switch some of the first and/or second converter stages off, namely dependent on the output current Iout.

The individual converter stages of the voltage converter can be implemented with any available switched-mode converter topology, such as a buck converter topology, a boost converter topology, a buck-boost converter topology, a flyback converter topology, or a forward converter topology. In a usual way these topologies are selected dependent on the desired relationship between the input voltage Vin and the output voltage Vout. If, for example, the input voltage Vin is smaller than the desired output voltage Vout, a boost converter topology can be used, wherein a buck converter topology would be used if the input voltage Vin is higher than the output voltage Vout.

Figure 6:
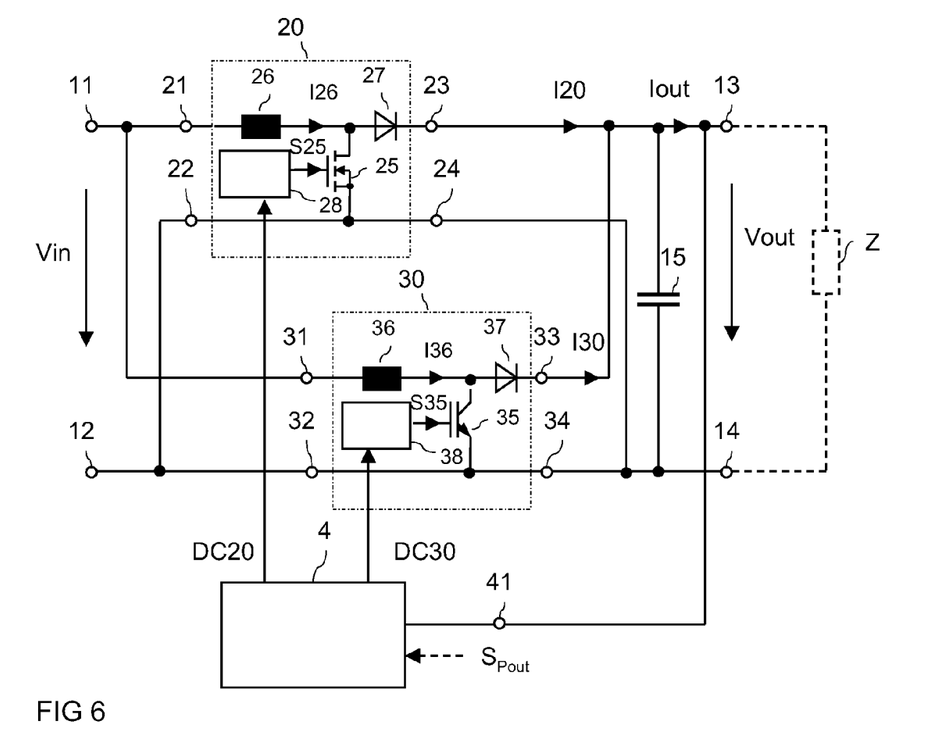
FIG. 6 illustrates a voltage converter with first and second converter stages which have a boost converter topology.

FIG. 6 schematically illustrates a voltage converter with one converter stage 20 and one second converter stage 30 that are each implemented with a boost converter topology. Each of these converter stages 20, 30 includes a series circuit with an inductive storage element 26, 36 and a switching element 25, 35, wherein in the first converter stage 20 the switching element 25 is implemented as a MOSFET, while in the second converter stage 30 the switching element 35 is implemented as an IGBT. This series circuit with the inductive storage element 26, 36 and the switching element 25, 35 is connected between the input terminals 21, 22 or 31, 32 of the converter stages 20, 30. Further, the inductive storage element 26, 36 in each converter stage 20, is connected in series with a rectifier element 27, 37, like a diode, between one 21, 31 of the input terminals and one 23, 33 of the output terminals. When the switching element 25, 35 is closed, the input voltage Vin drops across the inductive storage element 26, 36, which results in an increasing current I26, I36 through the inductive storage element 26, 36. When the switching element 25, 35 is subsequently opened (switched off) the input voltage Vin and the magnetic energy previously stored in the inductive storage elements 26, 36 causes an output current to flow via the rectifier element 27, 37. In boost converter stages, such as boost converter stages 20, 30 illustrated in FIG. 6, a current I26, I36 through the inductive storage element 26, 36 has a triangular wave form and increases when the switching element 25, 35 is switched on and decreases when the switching element 25, 35 is switched off. The output current of a boost-converter stage corresponds to the current through the inductive storage element 26, 36 when the switching element 25, 35 is switched off.

The voltage converter has an output stage that is common to the individual converter stages 20, 30. In the embodiment illustrated in FIG. 6 this output stage includes an output capacitor 15 which smoothes the ripple in the output currents I20, I30 induced by the switching operations. In this connection it should be mentioned that in FIGS. 2 and 4 and in other passages that relate to the relationship between the first and second output currents I20, I30 the mean value of these output currents during at least one drive cycle of the switching elements 25, is meant. A drive cycle of the switching elements 25, 35 includes an on-period in which the switching element 25, 35 is switched on, and a subsequent off-period in which the switching element 25, 35 is switched off.

Referring to FIG. 6, the converter stages 20, 30 include drive circuits 28, 38 that generate drive signals S25, S35 that switch the switching elements 25, 35 on and off. The drive circuits 28, 38 generate these drive signals S25, S35 dependent on the control signals DC20, DC30 provided by the control circuit 4. In particular, the drive circuits 28, 38 adjust duty-cycles of these drive signals S25, S35 dependent on the control signals DC20, DC30 provided by the control circuit 4.

Figure 7:
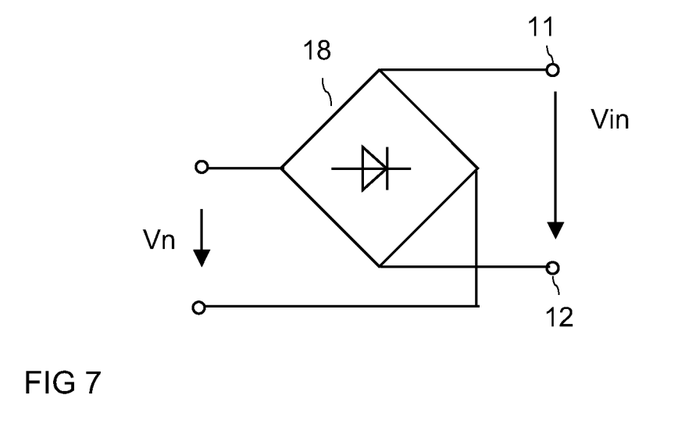
FIG. 7 illustrates an input stage of the voltage converter which receives an AC input voltage.

According to one embodiment a voltage converter with converter stages having a boost converter topology, such as the converter stages 20, 30 illustrated in FIG. 6, is implemented as a power factor controller (PFC). Such PFC receives an alternating input voltage Vin that has a waveform corresponding to the absolute value of a sine wave. Referring to FIG. 7, such input voltage Vin is, for example, generated from an AC mains voltage Vin using a bridge rectifier 18.

It should be mentioned that the individual converter stages of the voltage converter can operate like usual switched-mode converters with the difference that their output power is adjusted by the control circuit 4 instead of being merely adjusted by a feedback signal that is dependent on the output voltage.

According to one embodiment the drive circuits, like the drive circuits 28, 38 of FIG. 6, of the converter stages connected in parallel are configured to generate the drive signals, like the drive signals S25, S35 in FIG. 6, such that these drive signals are phase-shifted relative to one another or are interleaved. The phase shift between the individual control signals is, for example, 360°/(m+n), wherein m+n is the overall number of converter stages connected in parallel. The "phase shift" is the time difference between the time of switching on the switching element in one converter stage and the time of switching on the switching element in another converter stage. If the duration of the drive cycles in the individual converter stages is T, then a phase shift of 360°/(m+n) represents a time delay of T/(m+n).

Figure 8:
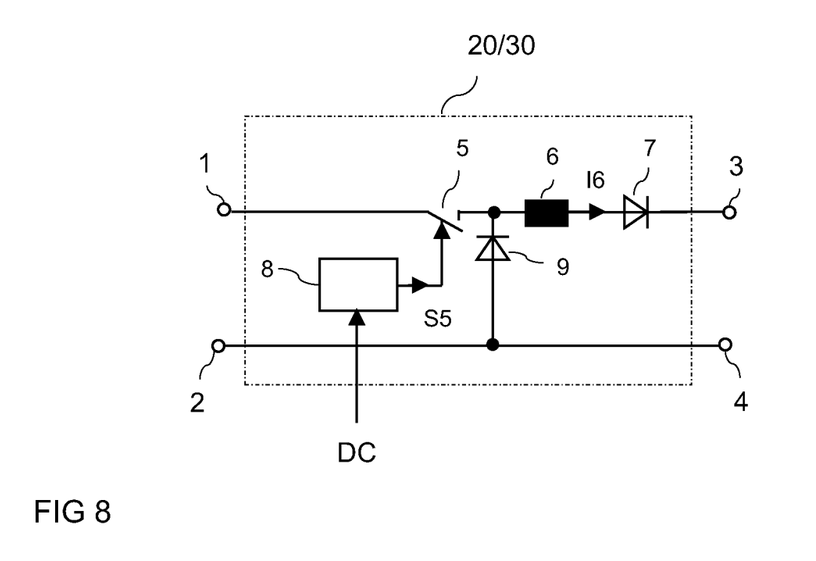
FIG. 8 illustrates a converter stage with a buck converter topology.
Figure 9:
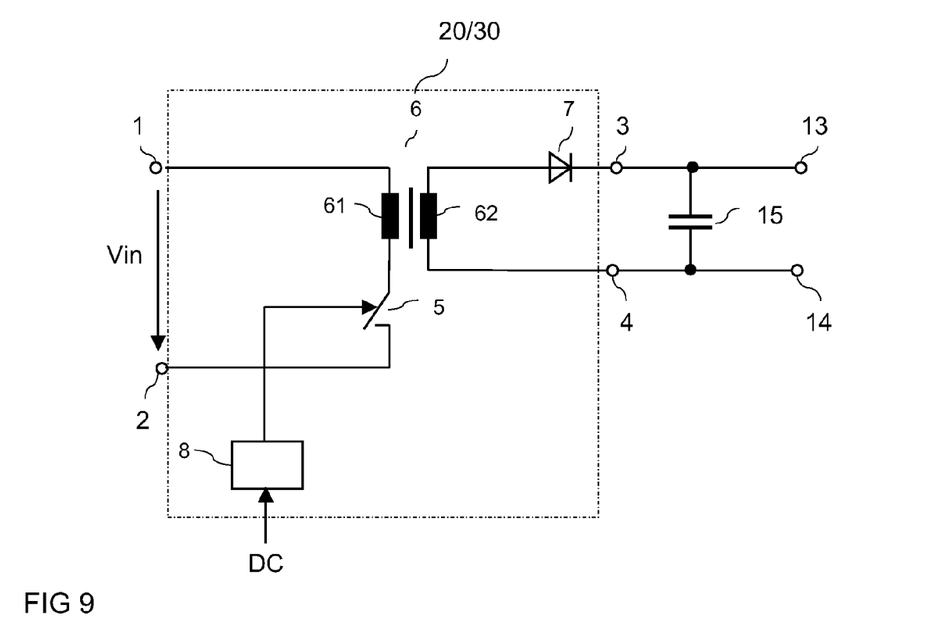
FIG. 9 illustrates a converter stage with a flyback converter topology.
Figure 10:
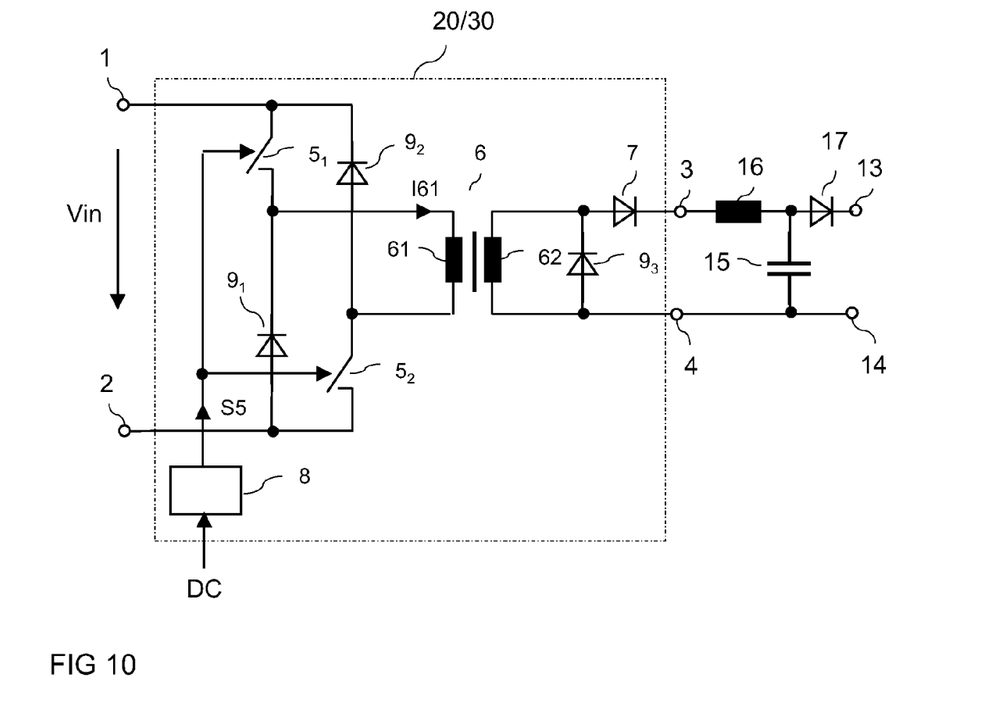
FIG. 10 illustrates a converter stage with a forward converter topology, in particular a two transistor forward (TTF) topology.

The voltage converter is, of course, not restricted to be implemented using converter stages having a boost converter topology. With reference to FIGS. 8 to 10 examples of other converter stages that can be used will be explained. The topologies explained in FIGS. 8 to 10 can be used to implement the first converter stages and the second converter stages with the difference that the at least one switching element in the first converter stage is implemented as a MOSFET, and in the second converter stage is implemented as an IGBT. In FIGS. 8 to 10 this switching element is schematically illustrated as a switch that has reference number 5. In FIGS. 8 to 10 terminals 1, 2 represent the input terminals and terminals 3, 4 represent the output terminals of the converter stages, drive circuit 8 represents the drive circuit that drives the at least one switching element in the converter stages, S5 represents the drive signal provided by the drive circuit, and DC represents the control signal received by the individual converter stage from the control circuit 4 (not illustrated in FIG. 8).

FIG. 8 illustrates a converter stage implemented with a buck converter topology. In this converter stage a series circuit with the switching element 5, an inductive storage element 6 and a rectifier element 7, like a diode, is connected between one of the input terminals (1) and one of the output terminals (3). A further rectifier element 9, like a diode, is connected in series with the inductive storage element 6 and the first rectifier element 7 between the output terminals 3, 4. The second rectifier element 9 acts as a freewheeling element which allows current I6 to further flow through the inductive storage element 6 when the switching element 5 is switched off.

FIG. 9 illustrates an embodiment of a converter stage 20/30 which is implemented with a flyback converter topology. This converter stage includes a transformer 6 used as an inductive storage element with a primary winding 61 and a secondary winding 62. The primary winding 61 is connected in series with the switching element 5 wherein the series circuit with the primary winding 61 and the switching element 5 is connected between the input terminals 1, 2. The secondary winding 62 is inductively coupled with the primary winding 61. A rectifier element 7, like a diode, is connected in series with the secondary winding 62, wherein the series circuit with the secondary winding 62 and the rectifier element 7 is connected between the output terminals 3, 4. The rectifier element 7 together with an output capacitor 15 forms a rectifier circuit. Output capacitor 15 can be common to the individual converter stages connected in parallel, from which only one is illustrated in FIG. 9. In the flyback converter stage according to FIG. 9 magnetic energy is stored in the primary winding 61 when the switching element 5 is switched on. When the switching element 5 is subsequently switched off the energy is transferred from the primary winding 61 to the secondary winding 62 and causes an output current to flow via the rectifier element 7.

FIG. 10 illustrates an embodiment of a converter stage implemented as a forward converter, in particular a two transistor forward (TTF) converter. This converter includes a transformer 6 with a primary winding 61 and a secondary winding 62. While in the flyback converter stage according to FIG. 9 the primary winding 61 and the secondary winding 62 have opposite winding senses, the primary winding 61 and the secondary winding 62 of the forward converter stage of FIG. 10 have common winding senses. The primary winding 61 is connected in series with a first switching element 5₁ and a second switching element 5₂, wherein this series circuit with the primary winding 61 and the first and second switching elements 5₁, 5₂ is connected between the input terminals 1, 2. A first switching element 5₁ is connected between a first input terminal 1 and the primary winding 61, and a second switching element 5₂ is connected between a second input terminal 2 and a second terminal of the primary winding 61. In a first converter stage the switching elements 5₁, 5₂ are implemented as MOSFETs, while in a second converter stage these switching elements 5₁, 5₂ are implemented as IGBTs. The switching elements 5₁, 5₂ are switched on and off simultaneously by a drive signal S5 generated by the drive circuit 8 dependent on the control signal DC. When the switching elements 5₁, 5₂ are closed, the input voltage Vin is applied to the primary winding 61 which results in an increasing current I61 flowing through the primary winding 61. When the switching element 5₁, 5₂ are switched off, rectifier elements 9₁, 9₂ allow the current through the primary winding 61 to further flow. A first rectifier element 9₁ is connected between the first terminal of the primary winding 61 and the second input terminal 2, and a second rectifier element 9₂ is connected between the second terminal of the primary winding 61 and the first input terminal 1. These rectifier elements are, for example, implemented as diodes that are interconnected such that they are reverse biased, when the switching elements 5₁, 5₂ are switched on.

The secondary winding 62 of the forward converter is connected in series with a rectifier element 7, wherein the series circuit with the secondary winding 62 and the rectifier element 7 is connected between the output terminals 3, 4. A further rectifier element 9₃, such as a diode, is connected in parallel with the secondary winding 62.

In FIG. 10, besides the forward converter stage an output stage of a voltage converter with forward converter stages, such as the forward converter stage illustrated in FIG. 10, is also illustrated. This output stage besides the output capacitor 15 includes a further inductor storage element 16 connected between one of the output terminals (3) of the converter stages and one of the output terminals (13) of the voltage converter. A rectifier element 17, like a diode, is connected in series with the inductive storage element 16. Optionally, a further rectifier element 17, like a diode is connected between the output capacitor 15 and the output terminal 13. This diode provides a "hot-plug in" functionality of the converter.

Figure 11:
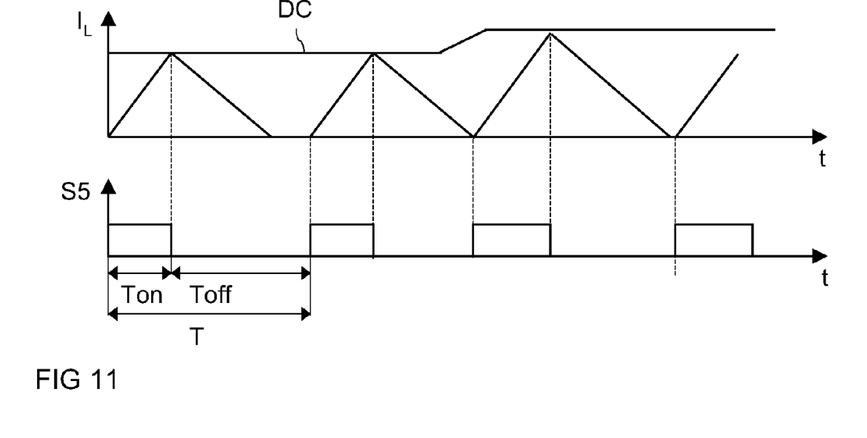
FIG. 11 illustrates the operating principle of a converter stage operating in discontinuous conduction mode (DCM)
Figure 12:
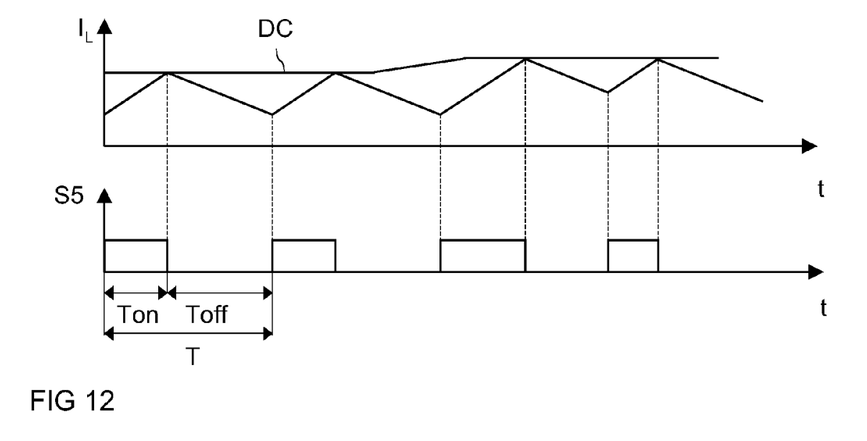
FIG. 12 illustrates the operating principle of a converter stage operating in continuous conduction mode (CCM)
Figure 13:
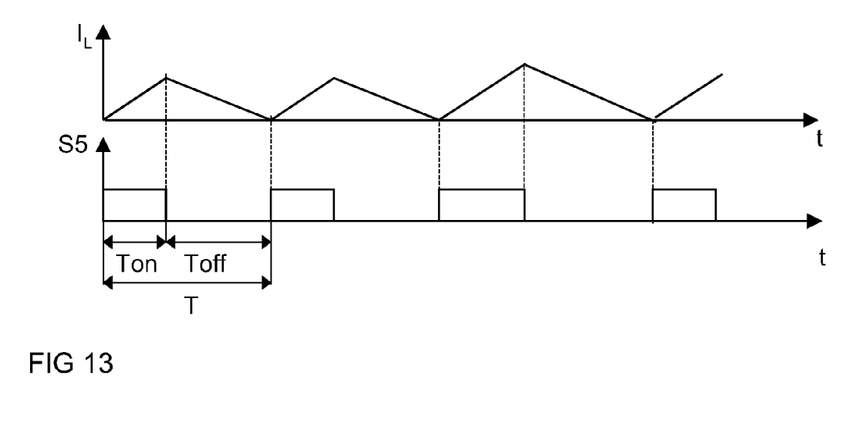
FIG. 13 illustrates the operating principle of a converter stage operating in critical conduction mode.

The individual converter stages that are each implemented as switched-mode voltage converters can be operated like conventional switched-mode converters, i.e., can be operated in one of several different operation modes that are available for switched-mode converters. Three different operation modes and means how to adjust the output power of the converter stages in these different operation modes will now be explained with reference to FIGS. 11 to 13. $I_L$ in FIGS. 11 to 13 represents the current through the inductive storage elements 26, 36 of FIG. 6, the inductive storage element 6 of FIG. 8, the sum of the currents through the primary winding 61 and the secondary winding 62 of FIG. 9, and the current through the primary winding 61 of FIG. 10. In FIGS. 11 to 13 a high-level of the drive signal S5 represents an on-level, which is a signal level when the switching element is switched on, and a low-level of the drive signal S5 represents an off-level, which is a signal level when the switching element is switched off. T is the duration of one drive cycle, Ton is the duration of an on-period and Toff is the duration of an off-period. The duty cycle of the drive cycle S5 is given by the reshow between the on-period Ton and the duration T of one drive cycle.

FIG. 11 illustrates the operation of a voltage converter stage in a discontinuous conduction mode (DCM). In this DCM the switching element is periodically switched on with a frequency f=1/T, i.e., the drive signal S5 periodically assumes an on-level. In the DCM the current through the inductive storage element is allowed to decrease to zero during the off-period before the switching element is switched on again. The output power of a converter stage being operated in DCM can be controlled by comparing the current through the inductive storage element with a threshold value and by switching off the switching element each time the increasing current through the inductive storage element reaches the threshold value. The threshold value used for controlling the output power is, for example, the control signal DC received by the voltage converter stage. In FIG. 11 two different values of the control signal DC are illustrated. As it can be seen, the peak current through the inductive storage element and, therefore, the mean value of the output current increases with increasing control signal DC when the converter stages operated in DCM.

FIG. 12 illustrates the operation of a converter stage operating in a continuous conduction mode (CCM). In this mode the switching element 5 is periodically switched on with a frequency f=1/T. In CCM the current through the inductive storage element does not decrease to zero, but the switching element is switched on again before the current through the inductive storage element during the off-period can decrease to zero. The output power and, therefore, the output current can be controlled by comparing the current through the inductive storage element with a threshold value and by, for example, switching off the switching element each time the current through the inductive storage element reaches the threshold value. The threshold value is, for example, the control signal DC received by the converter stage.

FIG. 13 illustrates the operation of a converter stage operating in a critical conduction mode or boundary conduction mode. In this operation mode the switching element is switched on each time the current through the inductive storage element decreases to zero. The output power can be controlled by adjusting the on-period, wherein for a given input voltage Vin the output power increases with increasing on-period. The critical conduction mode is, for example, used in converter stages implemented as boost-converter stages in a PFC.

It should be appreciated that using one of the converter topologies explained hereinbefore for implementing the converter stages and operating these converter stages in one of the operation modes explained hereinbefore, is only an example. One of the relevant aspects, namely providing a major share of the output current by the at least one first converter stage for low currents, i.e., for currents within the first output current range can be implemented using any converter stage topology and using any operation mode. This does also apply to a second relevant aspect, which is providing a major share of the output current by the at least one second converter stage for high currents, i.e., for currents within the second output current range. Providing a "major current" by the at least one first converter stage means that the output current supplied by one first converter stage or a plurality of first converter stages is higher than an output current supplied by one second converter stage or a plurality of second converter stages. Equivalently, providing a "major current" by the at least one second converter stage means that the output current supplied by one second converter stage or a plurality of second converter stages is higher than an output current supplied by one first converter stage or a plurality of first converter stages.

The converter stages of one converter, like the converter stages of the converters illustrated in FIGS. 1 and 4, can be operated in different operation modes, like one of the operation modes illustrated in FIGS. 11 to 12. In which of these modes the converter stages are operated can be dependent on the input voltage and dependent on the power consumption of the load. The converter is, for example, employed in a power factor controller (PFC), wherein in this case the individual converter stages are implemented as boost converters. A PFC provides a constant output voltage, for example, 400V, from a rectified main voltage (Vn in FIG. 6). In this case the input voltage Vin varies with a frequency which is twice the frequency of the main voltage between zero and a peak voltage, like 325V or 162V.

Dependent on the power consumption of the load, the converter stages can be operated in the DCM or the CCM throughout one period of the input voltage Vin, or the converter stages can change between the CCM and the DCM during one period, wherein for low input voltage values the converter stages are operated in the CCM and for higher input voltage values the converter stages are operated in the DCM. Whether the converter stages operate in DCM or in CCM is controlled by the control circuit 4, 40 in order to keep the output voltage Vout constant, namely widely independent of the input voltage Vin.

In converters that receive a periodic input voltage Vin, like converters in a PFC, it is possible to evaluate the operation mode of the converter in order to obtain an information on the output current and in order to decide which of the converter stages should contribute to the output current. Evaluating the operation modes means to evaluate the time during which the converter stages are operated in DCM and the time during which the converter stages are operated in CCM. These times are, for example, determined relative to an evaluation period, wherein the evaluation period is at least one period of the input voltage or is a multiple of the period of the input voltage.

The time when the converters operate in the DCM will be referred to as DCM-time and the time when the converters operate in the CCM will be referred to as CCM-time in the following. The DCM-time and the CCM-time can be expressed as shares of the period of the input voltage, i.e., a DCM-time of, for example, 70% means that the converter stages operate in the DCM during 70% of the time of the period of the input voltage Vin, while during 30% of this period time they are operated in CCM.

According to one embodiment, which is based on the embodiment illustrated in FIG. 2B, only the first converter stage 20 or the first converter stages $20_1$-$20_m$ is/are activated when the DCM-time is more than between 60% and 80% (i.e., when the CCM-time is lower than between 40% and 20%) and, in particular, more than 70%. This corresponds to the first threshold $Iout_1$ in FIG. 2B. According to this embodiment only the second converter stage 30 or the second converter stages $30_1$-$30_n$ are activated when the DCM-time is below between 30% and 0% (i.e., when the CCM-time is more than between 70% up to 100%), in particular less than 10%. This corresponds to the second threshold $Iout_2$ in FIG. 2B. For CCM-times between these thresholds both the first and second converter stages are activated.

Referring to FIG. 6, which illustrates boost converter stages, and to FIG. 12, which illustrates the operation of converter stages in CCM, the current through the diodes 27, 37 does not decrease to zero when the transistors 25, 35 are switched on, while in DCM the current through the diodes 27, 37 is zero when the transistors 25, 35 are switched on. Each time the transistors 25, 35 are switched on the diodes 27, 37 are reverse biased. When diodes are forward biased a charge carrier plasma with electrons and holes is present inside the diodes, wherein this charge carrier plasma, which corresponds to an electric charge stored in the diode, has to be removed from the diode before the diode blocks. In particular a diode implemented in silicon (Si) technology has a relatively long delay (latency) time between the time when it is reverse biased and the time when the diode blocks. This delay time causes losses. A diode implemented in silicon carbide (SiC) technology has a significantly lower delay time and, therefore, causes less loss. A SiC diode, however, is more expensive. According to one embodiment the diode 27 in the first (MOSFET) converter stage 20 is implemented as a Si diode, since this stage is mainly operated in the DCM, while the diode 37 in the second (IGBT) converter stage 30 is implemented as a SiC diode, since this stage is mainly operated in the CCM.

Finally it should be mentioned that features that were explained in connection with one embodiment can be combined with features of other embodiments even if this has not explicitly been mentioned.

What is claimed is:

1. A voltage converter comprising:
a first converter stage comprising a unipolar transistor coupled to a first inductive storage element, wherein the first converter stage is configured to provide a first output power signal comprising a first output voltage and a first output current;
a second converter stage comprising a bipolar transistor coupled to a second inductive storage element, wherein the second converter stage is configured to provide a second output power comprising a second output current and a second output voltage, wherein a third output power comprises a third output current and a third output voltage, and wherein the third output current is a sum of the first output current and the second output current; and
a control circuit configured to control the voltage converter comprising the first output current and the second output current, wherein the first output current is higher than the second output current when the third output current is within a first range, wherein the second output current is higher than the first output current when the third output current is within a second range, wherein the third output current has a third range that is within both the first range and the second range, wherein the first output current and the second output current are equal when the third output current is within in the third range, and wherein at least one of the first output current and the second output current increases as the third output current increases.

2. The voltage converter of claim 1, wherein the second output current is zero when the third output current is within the first range.

3. The voltage converter of claim 1, wherein the first range is between a minimum current and a second current, wherein the second current is between 10% and 50% of a maximum current.

4. The voltage converter of claim 1, wherein the first output current is zero when the third output current is within in the second range.

5. The voltage converter of claim 1, wherein the second range is between a first current and a maximum current, wherein the first current is between 50% to 80% of the maximum current.

6. The voltage converter of claim 1, wherein the first converter stage and the second converter stage have a same converter topology.

7. The voltage converter of claim 6, wherein the first converter stage and the second converter stage have a buck converter topology, a boost converter topology, a buck-boost converter topology, a flyback converter topology, or a forward converter topology.

8. The voltage converter of claim 1, wherein a first plurality of converter stages comprises the first converter stage, and a second plurality of converter stages comprises the second converter stage.

9. The voltage converter of claim 1, wherein the second range comprises third output current levels that are higher than third output current levels in the first range.

10. A voltage conversion method, the method comprising:
receiving an input power comprising an input voltage and an input current;
providing a first output power comprising a first output voltage and a first output current, wherein the first output current has a first range and a second range;
providing a second output power from a first converter stage, wherein the second output power comprises a second output voltage and a second output current, and wherein the first converter stage comprises a unipolar transistor coupled to a first inductive storage element;
providing a third output power from a second converter stage, wherein the third output power comprises a third output current and a third output voltage, wherein the second converter stage comprises a bipolar transistor coupled to a second inductive storage element, and wherein the first output current is a sum of the second output current and the third output current; and
controlling the second output current and the third output current, wherein the second output current is higher than the third output current when the first output current is within the first range, wherein at least one of the second output current and the third output current increases as the first output current increases, and wherein the third output current is higher than the second output current when the first output current is within the second range.

11. The method of claim 10, wherein the third output current is zero when the first output current is within the first range.

12. The method of claim 10, wherein the first range comprises a range between a minimum current and a further current, wherein the further current is between 10% and 50% of a maximum current.

13. The method of claim 10, wherein the second output current is zero when the first output current is within the second range.

14. The method of claim 10, wherein the second range comprises a range between a first current and a maximum current, wherein the first current is between 50% to 80% of the maximum current.

15. The method of claim 10, wherein the first output current has a third range that is within both the first range and the second range, wherein, when the first output current is within the third range, the second output current is either constant or decreases as the first output current increases within the first range and the third output current increases as the first output current increases within the third range.

16. The method of claim 10, wherein a first plurality of converter stages comprises the first converter stage, and a second plurality of converter stages comprises the second converter stage.

17. The method of claim 10, wherein the second range comprises third output current levels that are higher than third output current levels in the first range.

18. A power converter comprising:
a control circuit configured to be coupled to a first converter stage and a second converter stage, wherein the first converter stage comprises a unipolar transistor coupled to a first inductive storage element, and wherein the first converter stage is configured to provide a first output power comprising a first output voltage and a first output current,
the second converter stage comprises a bipolar transistor coupled to a second inductive storage element, and wherein the second converter stage is configured to provide a second output power comprising a second output current and a second output voltage, wherein a third output power comprising a third output current and a third output voltage is a sum of the first output power and the second output power, and
the control circuit is configured to control the first converter stage and the second converter stage to cause the first output current to be higher than the second output current when the third output current is within a first range, wherein at least one of the first output current and the second output current increases as the third output current increases, wherein the control circuit comprises a controller configured to receive a reference voltage and a fourth output voltage, wherein the controller is configured to calculate a difference between the reference voltage and the third output voltage, and wherein the controller is configured to generate an output power control signal in accordance with the difference between the reference voltage and the fourth output voltage.

19. The control circuit of claim 18, wherein the fourth output voltage is proportional to the third output voltage.

20. The control circuit of claim 18, further comprising a sharing unit coupled to the controller, wherein the sharing unit is configured to generate a first control signal for the first converter stage and a second control signal for the second converter stage in accordance with the output power control signal.

21. The control circuit of claim 20, wherein the sharing unit is further configured to receive a fourth output power proportional to the third output power.

22. The power converter of claim 18, wherein:
the first output current is higher than the second output current when the third output current is within the first range, and the second output current is higher than the first output current when the third output current is within a second range; and
the second range comprises third output current levels that are higher than third output current levels in the first range.

23. A voltage converter comprising:
a first converter stage comprising a unipolar transistor coupled to a first inductive storage element, wherein the first converter stage is configured to provide a first output power signal comprising a first output voltage and a first output current;
a second converter stage comprising a bipolar transistor coupled to a second inductive storage element, wherein the second converter stage is configured to provide a second output power comprising a second output current and a second output voltage, wherein a third output power comprises a third output current and a third output voltage, and wherein the third output current is a sum of the first output current and the second output current; and
a control circuit configured to control the voltage converter comprising the first output current and the second output current, wherein the first output current is higher than the second output current when the third output current is within a first range, wherein the second output current is higher than the first output current when the third output current is within a second range, wherein the third output current has a third range that is within both the first range and the second range, wherein when the third output current is within the third range, the first output current is either constant or decreases as the third output current increases and the second output current increases as the third output current increases, and wherein at least one of the first output current and the second output current increases as the third output current increases.

24. A voltage converter comprising:
a first converter stage comprising a unipolar transistor coupled to a first inductive storage element, wherein the first converter stage is configured to provide a first output power signal comprising a first output voltage and a first output current;
a second converter stage comprising a bipolar transistor coupled to a second inductive storage element, wherein the second converter stage is configured to provide a second output power comprising a second output current and a second output voltage, wherein a third output power comprises a third output current and a third output voltage, and wherein the third output current is a sum of the first output current and the second output current; and
a control circuit configured to control the voltage converter comprising the first output current and the second output current, wherein the first output current is higher than the second output current when the third output current is within a first range, wherein at least one of the first output current and the second output current increases as the third output current increases, wherein a first plurality of converter stages comprises the first converter stage, wherein a second plurality of converter stages comprises the second converter stage wherein converter stages of the first plurality of converter stages provide approximately equal output currents, and wherein converter stages of the second plurality of converter stages provide approximately equal output currents.

25. A voltage converter comprising:
a first converter stage comprising a unipolar transistor coupled to a first inductive storage element, wherein the first converter stage is configured to provide a first output power signal comprising a first output voltage and a first output current;
a second converter stage comprising a bipolar transistor coupled to a second inductive storage element, wherein the second converter stage is configured to provide a second output power comprising a second output current and a second output voltage, wherein a third output power comprises a third output current and a third output voltage, and wherein the third output current is a sum of the first output current and the second output current; and
a control circuit configured to control the voltage converter comprising the first output current and the second output current, wherein the first output current is higher than the second output current when the third output current is within a first range, wherein at least one of the first output current and the second output current increases as the third output current increases, wherein a first plurality of converter stages comprises the first converter stage, wherein a second plurality of converter stages comprises the second converter stage, and wherein the control circuit is further configured to switch off converter stages of the first plurality of converter stages individually to switch off an increasing number of converter stages of the first plurality of converter stages as the third output current decreases within the first range.

26. A voltage conversion method, the method comprising:
receiving an input power comprising an input voltage and an input current;
providing a first output power comprising a first output voltage and a first output current, wherein the first output current has a first range and a second range;
providing a second output power from a first converter stage, wherein the second output power comprises a second output voltage and a second output current, and wherein the first converter stage comprises a unipolar transistor coupled to a first inductive storage element;

providing a third output power from a second converter stage, wherein the third output power comprises a third output current and a third output voltage, wherein the second converter stage comprises a bipolar transistor coupled to a second inductive storage element, and wherein the first output current is a sum of the second output current and the third output current; and controlling the second output current and the third output current, wherein the second output current is higher than the third output current when the first output current is within the first range, wherein at least one of the second output current and the third output current increases as the first output current increases, wherein a first plurality of converter stages comprises the first converter stage, wherein a second plurality of converter stages comprises the second converter stage, wherein converter stages of the first plurality of converter stages provide approximately equal output currents, wherein converter stages of the second plurality of converter stages provide approximately equal output currents.

27. A voltage conversion method, the method comprising:

receiving an input power comprising an input voltage and an input current;

providing a first output power comprising a first output voltage and a first output current, wherein the first output current has a first range and a second range;

providing a second output power from a first converter stage, wherein the second output power comprises a second output voltage and a second output current, and wherein the first converter stage comprises a unipolar transistor coupled to a first inductive storage element;

providing a third output power from a second converter stage, wherein the third output power comprises a third output current and a third output voltage, wherein the second converter stage comprises a bipolar transistor coupled to a second inductive storage element, and wherein the first output current is a sum of the second output current and the third output current; and controlling the second output current and the third output current, wherein the second output current is higher than the third output current when the first output current is within the first range, wherein at least one of the second output current and the third output current increases as the first output current increases, wherein a first plurality of converter stages comprises the first converter stage, and wherein a second plurality of converter stages comprises the second converter stage, and wherein controlling the second output current and the third output current comprises switching off the converter stages of the first plurality of converter stages individually and switching off an increasing number of the converter stages of the first plurality of converter stages as the first output current decreases within the first range.

\* \* \* \* \*